United States Patent
Suvakovic et al.

(10) Patent No.: US 9,996,499 B2
(45) Date of Patent: Jun. 12, 2018

(54) SCALABLE AND PROGRAMMABLE PROCESSOR COMPRISING MULTIPLE COOPERATING PROCESSOR UNITS

(75) Inventors: Dusan Suvakovic, Pleasanton, CA (US); Adriaan J. de Lind van Wijngaarden, New Providence, NJ (US); Man Fai Lau, Baltimore, MD (US)

(73) Assignee: Alcatel Lucent, Boulogne-Billancourt (FR)

( * ) Notice: Subject to any disclaimer, the term of this patent is extended or adjusted under 35 U.S.C. 154(b) by 1139 days.

(21) Appl. No.: 13/248,869

(22) Filed: Sep. 29, 2011

(65) Prior Publication Data
US 2012/0079236 A1   Mar. 29, 2012

Related U.S. Application Data

(60) Provisional application No. 61/387,713, filed on Sep. 29, 2010.

(51) Int. Cl.
*G06F 15/78* (2006.01)
*G06F 9/38* (2018.01)

(52) U.S. Cl.
CPC ........ *G06F 15/7867* (2013.01); *G06F 9/3897* (2013.01); *Y02D 10/12* (2018.01); *Y02D 10/13* (2018.01)

(58) Field of Classification Search
CPC ......... H03M 13/1515; H03M 13/1525; H03M 13/153; H03M 13/1535
USPC ................................................ 714/781, 784
See application file for complete search history.

(56) References Cited

U.S. PATENT DOCUMENTS

| | | | | |
|---|---|---|---|---|
| 5,170,399 | A * | 12/1992 | Cameron et al. | 714/784 |
| 5,384,722 | A * | 1/1995 | Dulong | 708/201 |
| 6,209,114 | B1 * | 3/2001 | Wolf et al. | 714/784 |
| 6,412,090 | B1 * | 6/2002 | Pan | H03M 13/1515 714/784 |
| 2005/0273484 | A1 * | 12/2005 | Shieh | 708/492 |
| 2006/0059409 | A1 * | 3/2006 | Lee | 714/784 |
| 2008/0155381 | A1 * | 6/2008 | Gasanov et al. | 714/782 |

(Continued)

OTHER PUBLICATIONS

International Telecommunication Union, "Interfaces for the Optical Transport Network (OTN)," Recommendation ITU-T G.709/Y.1331, Dec. 2009, 218 pages.

(Continued)

*Primary Examiner* — Eric Coleman
(74) *Attorney, Agent, or Firm* — Ryan, Mason & Lewis, LLP

(57) ABSTRACT

A processor comprises a plurality of processor units arranged to operate concurrently and in cooperation with one another, and control logic configured to direct the operation of the processor units. At least a given one of the processor units comprises a memory, an arithmetic engine and a switch fabric. The switch fabric provides controllable connectivity between the memory, the arithmetic engine and input and output ports of the given processor unit, and has control inputs driven by corresponding outputs of the control logic. In an illustrative embodiment, the processor units may be configured to perform computations associated with a key equation solver in a Reed-Solomon (RS) decoder or other type of forward error correction (FEC) decoder.

24 Claims, 10 Drawing Sheets

(56) References Cited

U.S. PATENT DOCUMENTS

2008/0313253 A1* 12/2008 Shin et al. .................. 708/530
2011/0239094 A1* 9/2011 Kwok et al. ................. 714/782

OTHER PUBLICATIONS

IEEE Computer Society, "Part 3: Carrier Sense Multiple Access with Collision Detection (CSMA/CD) Access Method and Physical Layer Specifications," IEEE Std. P802.3av, Oct. 2009, 236 pages.

T. Yamane et al., "A Closed-Form Calculation of Yule-Walker Equation Based on Jacobi's Formula and its Application to Decoding of Reed-Solomon Codes," The Johns Hopkins University, Conference on Information Sciences and Systems, Mar. 2001, pp. 124-128.

D.V. Sarwate et al., "High-Speed Architectures for Reed-Solomon Decoders," IEEE Transactions on Very Large Scale Integration (VLSI) Systems, Oct. 2001, pp. 641-655, vol. 9, No. 5.

T. Buerner et al., "On a High-Speed Reed-Solomon Codec Architecture for 43 Gb/s Optical Transmission Systems," 24th International Conference on Microelectronics, May 2004, pp. 743-746, vol. 2, Nis, Serbia and Montenegro.

James L. Massey, "Shift-Register Synthesis and BCH Decoding," IEEE Transactions on Information Theory, Jan. 1969, pp. 122-127, vol. 15, No. 1.

D.V. Sarwate et al., "Modified Euclidean Algorithms for Decoding Reed-Solomon Codes," IEEE International Symposium on Information Theory, Jun./Jul. 2009, pp. 1398-1402, Seoul, Korea.

A.E. Heydtmann et al., "On the Equivalence of the Berlekamp-Massey and the Euclidean Algorithms for Decoding," IEEE Transactions on Information Theory, Nov. 2000, pp. 2614-2624, vol. 46, No. 7.

J. Baek et al., "Simplified Degree Computationless Modified Euclid's Algorithm and its Architecture," IEEE International Symposium on Circuits and Systems, May 2007, pp. 905-908.

J. Baek et al., "Low Hardware Complexity Key Equation Solver Chip for Reed-Solomon Decoders," IEEE Asian Solid-State Circuits Conference, Nov. 2007, pp. 51-54, Jeju, Korea.

S. Lee et al., "A High-Speed Pipelined Degree-Computationless Modified Euclidean Algorithm Architecture for Reed-Solomon Decoders," IEICE Transactions on Fundamentals, Mar. 2008, pp. 830-835, vol. E91-A, No. 3.

B. Yuan et al., "Area-Efficient Reed-Solomon Decoder Design for Optical Communications," IEEE Transactions on Circuits and Systems-II: Express Briefs, Jun. 2009, pp. 469-473, vol. 56, No. 6.

S. Kampf et al., "The Euclidean Algorithm for Generalized Minimum Distance Decoding of Reed-Solomon Codes," IEEE Information Theory Workshop, Aug./Sep. 2010, pp. 1-5, Dublin, Ireland.

International Telecommunication Union, "10-Gigabit-Capable Passive Optical Networks (XG-PON): Transmission Convergence (TC) Specifications," Recommendation ITU-T G.987.3, Oct. 2010, 146 pages.

\* cited by examiner

| Instruction Format |||| 
|---|---|---|---|
| read control: $\lambda, S, B$ | write control: $\lambda, S, B$ | mux control: $c_1, \ldots, c_7$ | next instruction/ jump control |

FIG. 5

| instruction label | pseudo-alg. line | data R/W DPRAM | GFMAC module | sum co-processor |
|---|---|---|---|---|
| INIT | [02] | $\lambda, S/$ | no | no |
| S_LAMBDA | [04] | $\lambda, S/\lambda$ | yes | yes |
| DIFF_VALID | [05] | $\lambda, S, B/B$ | no | yes |
| LAMBDA_UP | [06] | $\lambda, S, B/\lambda$ | yes | no |
| D_LAMBDA_UP1 | [06], [11] | $\lambda, S, B/\lambda$ | yes | no |
| D_LAMBDA_UP2 | [08] | $\lambda, S, B/B$ | yes | no |
| READOUT | [14] | $\lambda/$ | no | no |

FIG. 6

SCALABLE AND PROGRAMMABLE PROCESSOR COMPRISING MULTIPLE COOPERATING PROCESSOR UNITS

RELATED APPLICATION

The present application claims priority to U.S. Provisional Patent Application Ser. No. 61/387,713, filed Sep. 29, 2010 and entitled "Scalable Parallel Galois-Field Processor for Error Correction in Multi-Gigabit Communications," which is commonly assigned herewith and incorporated by reference herein.

FIELD OF THE INVENTION

The present invention relates generally to the field of signal processing, and more particularly relates to processors for processing signals in a communication system.

BACKGROUND OF THE INVENTION

A wide variety of different types of processors are known. By way of example, a processor may comprise an electronic circuit that carries out instructions of a program to perform basic arithmetic, logical and input/output operations of a digital system. Digital systems typically require a large number of arithmetic operations to be performed rapidly and repetitively. General purpose processors as well as specific processors and co-processors are found in a large number of digital systems, and these processors may include, again by way of example, central processing units, graphics processing units, digital signal processing units and network processors.

Processors can be particularly useful and flexible, but they typically include a program-oriented general purpose structure that limits the overall speed of the computations. Utilization of certain hardware elements is often low, and such elements may be difficult or even impossible to reuse for other purposes.

As an example, digital systems comprising Galois field (GF) arithmetic hardware or other types of hardware for performing computations over a finite field are utilized in a wide variety of applications, including, by way of example, certain forward error correction (FEC) and cryptography.

As a more particular example, optical networks that include communication links having data rates of 10 Gbps or higher often incorporate FEC functionality using Reed-Solomon (RS) codes. The RS decoders utilized in such arrangements typically comprise GF-based arithmetic hardware, in particular GF-based multipliers and GF-based adders. However, the utilization of such multipliers is often low and poorly correlated with the decoder throughput. Nonetheless, as data rates continue to increase, the throughput of the decoder must be increased accordingly, requiring the deployment of expensive hardware having excessively large circuit area and high power consumption.

Similar problems arise in other applications involving the use of GF-based arithmetic hardware, as well as in applications involving other types of processing hardware for performing computations over a finite field. For example, cryptographic processors used to perform operations such as encryption and decryption in a communication system can also suffer from the above-noted circuit area and power consumption drawbacks.

It is therefore apparent that a need exists for improved processor configurations that can alleviate the drawbacks of large circuit area and high power consumption that often arise in conventional processing hardware.

SUMMARY OF THE INVENTION

Illustrative embodiments of the present invention provide area efficient and low power processor configurations that are particularly well suited for use in performing arithmetic operations, including, for example, finite field arithmetic operations such as Galois field arithmetic operations in a RS decoder or other type of algebraic FEC decoder. A given such processor comprises a plurality of processor units and associated control logic, and is readily scalable and programmable to facilitate its implementation in a wide variety of different processing applications.

In one embodiment, a processor comprises a plurality of processor units arranged to operate concurrently and in cooperation with one another, and control logic configured to direct the operation of the processor units. At least a given one of the processor units comprises a memory, an arithmetic engine and a switch fabric. The memory may illustratively comprise a multi-port memory. The switch fabric may comprise a plurality of multiplexers that are configured to provide controllable connectivity between the memory, the arithmetic engine and input and output ports of the given processor unit, and has control inputs driven by corresponding outputs of the control logic.

The processor units may be configured in one or more illustrative embodiments to perform computations associated with a key equation solver in an RS decoder or other algebraic FEC decoder, although the processor units can also be utilized in a wide variety of other applications.

The illustrative embodiments provide significant advantages over conventional approaches. For example, in one or more of these embodiments, each of the processor units requires only a single multiplier, such that the total number of multipliers used in a key equation solver of a FEC decoder may be made substantially less than a maximum number of errors that are correctable using the corresponding FEC code.

These and other features and advantages of the present invention will become more apparent from the accompanying drawings and the following detailed description.

BRIEF DESCRIPTION OF THE DRAWINGS

FIGS. 5 and 6 show an instruction format and an instruction set, respectively, utilized in the FIG. 4 processor.

DETAILED DESCRIPTION OF THE INVENTION

The present invention will be illustrated herein in conjunction with exemplary communication systems, processing devices and forward error correction decoding techniques. It should be understood, however, that the invention is not limited to use with the particular types of systems, devices and techniques disclosed. For example, aspects of the present invention can be implemented in a wide variety of other communication system configurations, using processing devices and processing operations other than those described in conjunction with the illustrative embodiments.

Figure 1A:
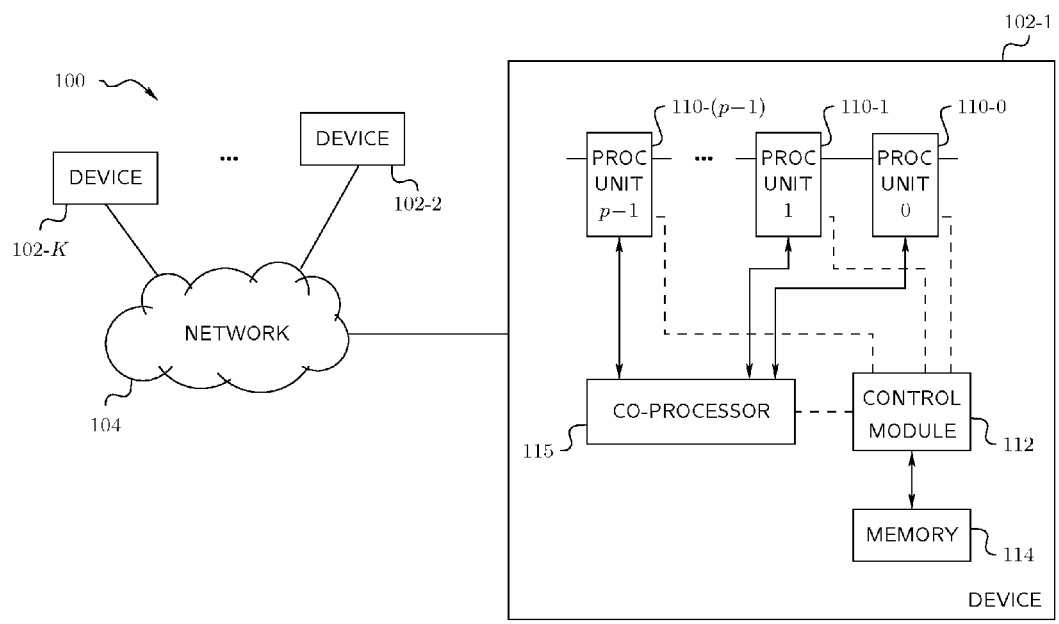
FIG. 1A is a block diagram of a communication system that incorporates at least one processing device having a processor configured with multiple processor units operating concurrently and in cooperation with one another in an illustrative embodiment of the invention.

FIG. 1A shows a communication system 100 comprising a plurality of processing devices 102-1, 102-2, . . . 102-K that communicate over a network 104. The processing devices 102 may comprise, by way of example, computers, servers, switches, routers, mobile telephones, wireless email devices, television set-top boxes, or other types of communication devices, in any combination. A given one of the processing devices 102 may alternatively represent a portion of such a communication device. The signals communicated between processing devices 102 over the network 104 may comprise data, speech, images, video, audio or other types of signals in any combination. These signals are subject to FEC coding before being transmitted over the network 104. The network 104 may comprise a wide area network such as the Internet, a metropolitan area network, a local area network, a cable network, a telephone network, a satellite network, as well as portions or combinations of these or other networks. As a more particular example, the network 104 may comprise an optical core network or optical access network having multi-gigabit communication links.

A particular processing device 102-1 is shown in greater detail in FIG. 1A, and at least a subset of the other processing devices of the system 100 may be assumed without limitation to be configured in a similar manner. The processing device 102-1 as shown comprises a plurality of processor units 110-0, . . . 110-$p$, 110-($p$−1) arranged in parallel with one another, and a control module 112 configured to direct the operation of the processor units 110. The processing device further comprises a memory 114, and a co-processor 115.

Figure 1B:
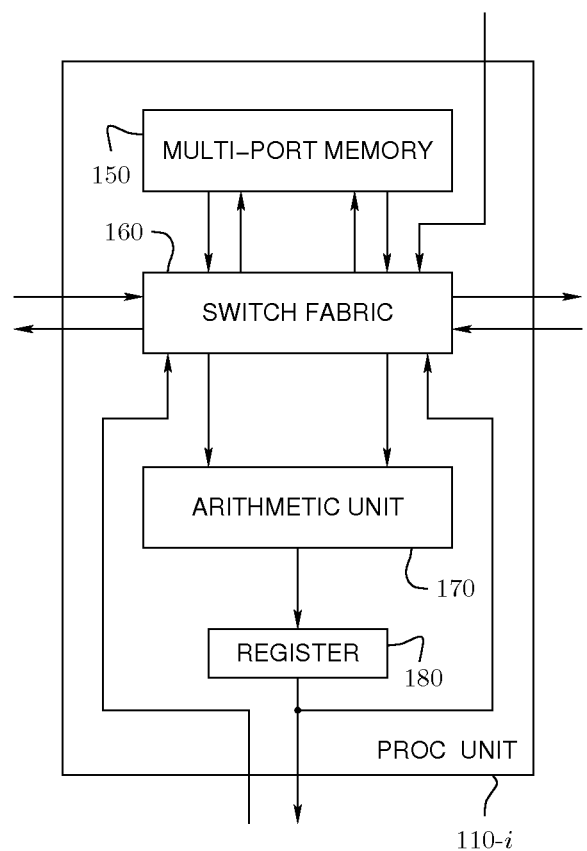
FIG. 1B is an illustrative example of a processor unit in a processing device of the FIG. 1A system.

FIG. 1B shows a general overview of a particular processor unit 110-$i$ of FIG. 1A, where i is an integer value from 0 to p−1. In this embodiment, the processor unit 110-$i$ comprises a multi-port memory 150, a switch fabric 160, an arithmetic unit 170 and a register 180. The operation of exemplary implementations of such processor unit elements will be described below in conjunction with FIGS. 3 through 8. The remaining processor units 110 of device 102-1 may be assumed to be configured in a similar manner.

The processor units 110, control module 112, and memory 114 may be collectively viewed as one example of what is more generally referred to herein as a "processor." A given processing device may therefore comprise a processor and one or more additional components, such as a co-processor. A processor can be implemented using, for example, an application-specific integrated circuit (ASIC), a field-programmable gate array (FPGA), or other type of integrated circuit, as well as portions or combinations of such integrated circuits.

The control module 112 may be viewed as an example of what is more generally referred to herein as "control logic." In other embodiments, portions of such control logic may be incorporated into other device elements, such the co-processor 115. Also, the processor units 110 and other device elements may be coupled to additional device elements of a conventional nature that are omitted from the figure for clarity and simplicity of illustration.

Although the processor units 110 in the present embodiment are arranged in parallel with one another, in other embodiments the processor units may be configured using other types of arrangements in which such processor units operate concurrently and in cooperation with one another. By way of example, the processor units as arranged in the embodiments of FIGS. 4 and 7 may be viewed as illustrative of ring arrangements. The arrangement shown in FIG. 8 shows one set of processor units configured in a ring arrangement and another set of processor units configured in a parallel arrangement. All such arrangements of processor units are considered examples of arrangements in which a plurality of processor units are arranged to operate concurrently and in cooperation with one another.

In the present embodiment, it is assumed that each of the processor units 110 comprises a finite field processor unit configured to perform computations over a finite field, such as a Galois field. For example, such computations may be performed in conjunction with the decoding of data that has been encoded using a designated algebraic FEC code, such as an RS code, a Bose Chaudhuri Hocquenghem (BCH) code, an algebraic geometric code or a quadratic residue code, although a wide variety of other codes could also be used.

As will be described, the processor units are area efficient and require only a low amount of power. For example, the total number of multipliers collectively provided by the processor units may be substantially less than a maximum number of errors that are correctable using the designated algebraic FEC code. The processor units 110 and other related elements of processing device 102-1 may additionally or alternatively be adapted for use in other applications involving finite field computations, such as, for example, encryption and decryption. Another example of an application in which techniques disclosed herein may be utilized is network coding, where finite field arithmetic is used to reconstruct and/or correct packets that are transmitted through a network The memory 114 may be used to store software programs that are executed by one or more of the processor units 110, the control module 112 and the co-processor 115 in order to implement at least a portion of the functionality described herein. The memory 114 may comprise an electronic memory such as random access memory (RAM), read-only memory (ROM) or combinations of these and other types of storage devices. Such a memory is an example of what is more generally referred to herein as a computer program product or still more generally as a computer-readable storage medium that has executable program code embodied therein. Other examples of computer-readable storage media may include disks or other types of magnetic or optical media, in any combination.

The processing devices 102 may each include additional components configured in a conventional manner. For example, each of these elements will generally include network interface circuitry for interfacing with the network 104.

Figure 2A:
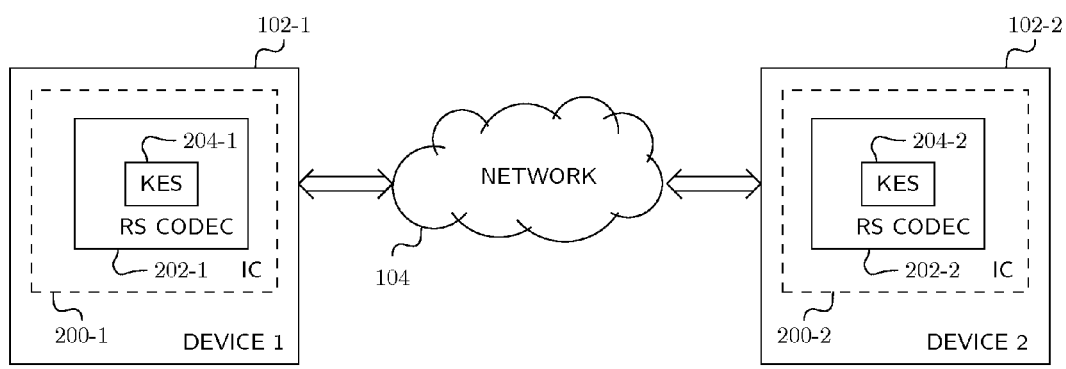
FIG. 2A illustrates an exemplary implementation of first and second processing devices of the FIG. 1A system in a FEC coding application.

FIG. 2A illustrates one possible manner in which first and second processing devices 102-1 and 102-2 of the communication system 100 may be configured to support FEC functionality for communications between those devices over the network 104. The processing devices 102-1 and 102-2 comprise respective transceiver integrated circuits (ICs) 200-1 and 200-2 which include respective RS codecs 202-1 and 202-2. A given one of the transceivers 200 comprises both a transmitter and a receiver, and a given one of the RS codecs 202 comprises both an RS coder and an RS decoder. Associated with each RS decoder is a corresponding key equation solver (KES) 204-1 or 204-2.

In operation, RS coded signals generated by the transmitter of processing device 102-1 and transmitted over the network 104 to processing device 102-2 are decoded using the RS decoder 202-2 and its key equation solver 204-2 in the receiver of that processing device. Similarly, RS coded signals generated by the transmitter of processing device 102-2 and transmitted over the network 104 to processing device 102-1 are decoded using the RS decoder 202-1 and its key equation solver 204-1 in the receiver of that processing device. Again, the other processing devices 102 of the system 100 may be configured in a similar manner. The key equation solvers 204-1 and 204-2 may perform computations associated with RS decoding using a Berlekamp-Massey algorithm or a modified Euclidean algorithm. More detailed embodiments of processors configured to implement these algorithms using processor units 110, control module 112, memory 114 and other related elements will be described in conjunction with FIGS. 4 and 7, respectively.

Figure 2B:
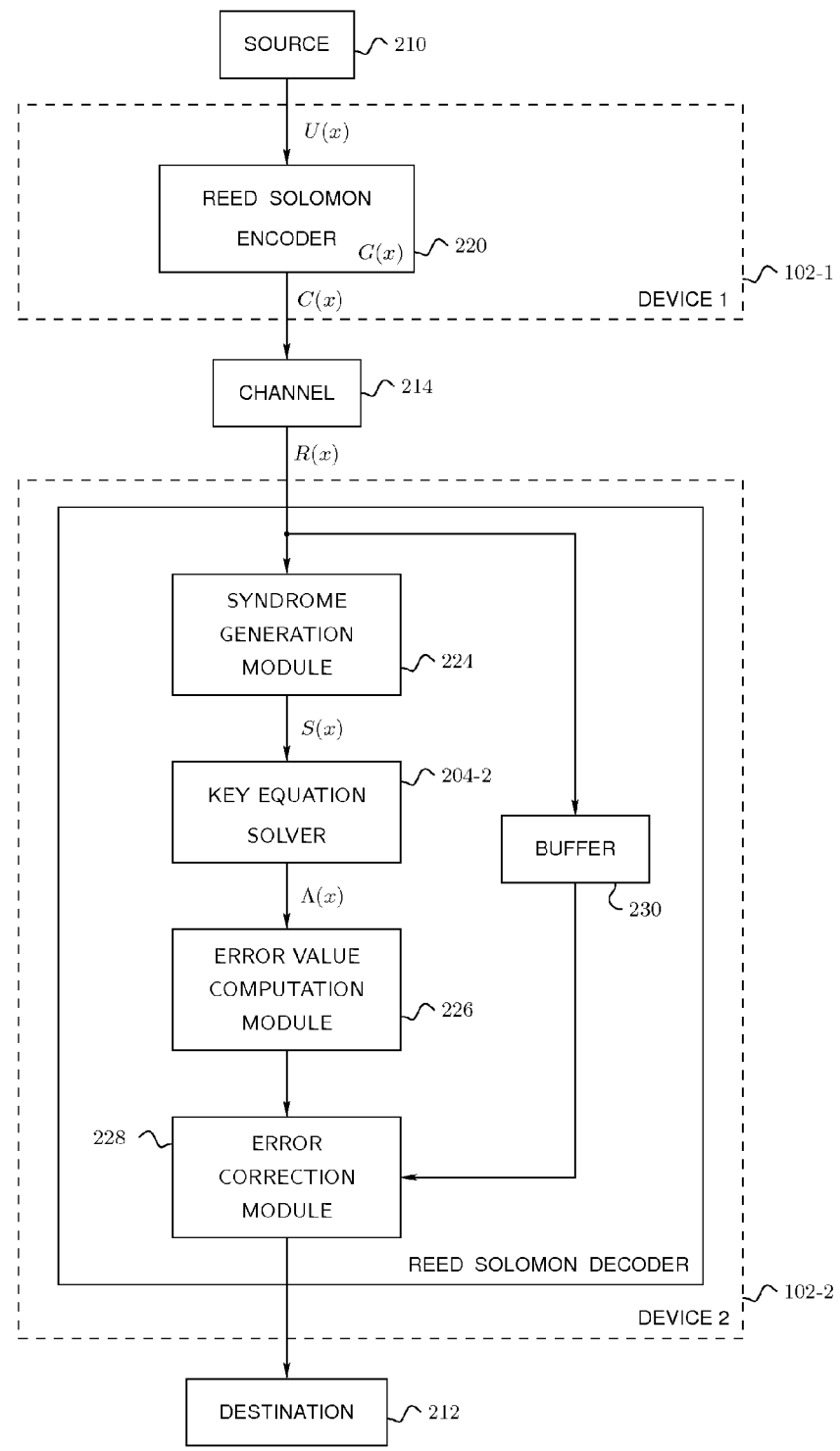
FIG. 2B is a schematic diagram showing a more detailed view of the operation of a Reed Solomon encoder and a Reed Solomon decoder, and in particular the location of the key equation solver module.

FIG. 2B shows a more detailed view of the operation of an RS encoder and an RS decoder in an embodiment in which a source element 210 communicates with a destination element 212 over a channel 214. The source and destination elements 210 and 212 are associated with respective devices 102-1 and 102-2, and the channel 214 may comprise a connection established between such devices over network 104. Data from the source element 210 is applied to RS encoder 220 in device 102-1 and transmitted over channel 214. The device 102-2 processes received data in an RS decoder comprising syndrome generator module 224, key equation solver 204-2, error value computation module 226, error correction module 228 and buffer 230.

The various modules shown in FIG. 2A and FIG. 2B may be viewed as examples of circuitry used to implement the associated functionality. Such circuitry may comprise well-known conventional encoding and decoding circuitry suitably modified to operate in the manner described herein. For example, portions of such circuitry may comprise processor and memory circuitry associated with the elements 110, 112, 114 and 115 of FIG. 1. Conventional aspects of such processor and memory circuitry are well known to those skilled in the art and therefore will not be described in detail herein.

Figure 3:
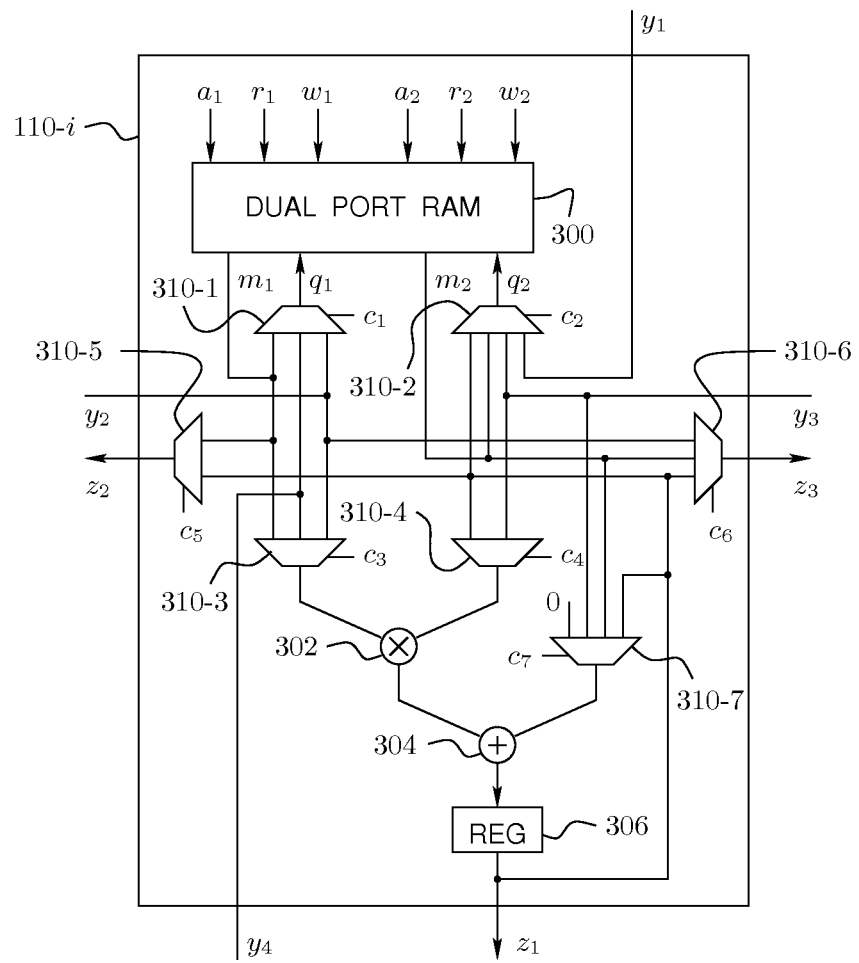
FIG. 3 is a schematic diagram showing a more detailed view of a given one of the processor units of FIG. 1.

FIG. 3 shows a given one of the processor units 110-$i$ in greater detail. In this embodiment, the processor unit 110-$i$ comprises a dual-port RAM 300 coupled to an arithmetic engine that includes a multiplier 302, an adder 304 and a register 306. The processor unit 110-$i$ further comprises a plurality of multiplexers 310 that collectively provide controllable connectivity between the dual-port RAM 300, elements of the arithmetic engine, and input and output ports of the given processor unit 110-$i$. The multiplexers 310 have respective control inputs driven by outputs of the control module 112. The register 306 provides an output $z_1$ of the processor unit 110-$i$.

In the present embodiment, the processor unit 110-$i$ comprises only a single multiplier 302. This is one example of an advantageous arrangement in which the total number of multipliers used by the complete set of processor units 110 as implemented in the key equation solver of a FEC decoder may be made substantially less than a maximum number of errors that are correctable using the corresponding FEC code.

The dual-port RAM 300 is utilized to store input data, intermediate results and algorithm variables. It is configured to permit the arithmetic engine to read at least two different input variables simultaneously, which saves processor cycles. It should be noted that the dual-port RAM 300 may represent a portion of a larger memory of the processing device 102-1, with that portion being allocated to the processor unit 110-$i$ and similar portions of the larger memory being allocated to the remaining processor units. In certain embodiments, the total amount of dual-port RAM allocated across the processor units may be kept substantially constant, such as that the size of the dual-port RAM connected to a single processor unit is inversely proportional to the total number of processor units. The dual-port RAM is one example of what is more generally referred to herein as a "multi-port memory." Other types of memory may be used in addition to or in place of at least a portion of the dual-port RAM, such as one or more banks of registers.

The dual-port RAM 300 has a first set of address, read and write inputs, denoted $a_1$, $r_1$ and $w_1$, respectively, and a second set of address, read and write inputs denoted $a_2$, $r_2$ and $w_2$, respectively. It also includes first and second data inputs $q_1$ and $q_2$, and first and second data outputs $m_1$ and $m_2$.

The input and output ports of the given processor unit 110-$i$ in the present embodiment include left and right input ports denoted $y_2$ and $y_3$, respectively, and left and right output ports denoted $z_2$ and $z_3$, respectively. These input and output ports are configured to permit shifting of data between the processor unit 110-$i$ and other ones of the processor units 110 arranged to the left and right of the processor unit 110-$i$. The processor unit 110-$i$ further comprises an additional input $y_4$ configured to receive an input from the external co-processor 115. The additional input port $y_4$ is a dedicated input to the processor unit 110-$i$ from the co-processor 115. The co-processor 115 may be used for implementation of certain elements in illustrative embodiments, such as inverter module 424 in the embodiment of FIG. 4 or zero detector 720 in the embodiment of FIG. 7.

As noted above, the multiplexers 310 collectively provide controllable connectivity between the dual-port RAM 300, elements of the arithmetic engine, and input and output ports of the given processor unit 110-$i$. The multiplexers may be viewed as an example of what is more generally referred to herein as a "switch fabric," illustratively shown as switch fabric 160 of FIG. 1B.

The switch fabric 160 in the present embodiment of processor unit 110-$i$ comprises a total of seven multiplexers 310, although this is by way of illustrative example only. More specifically, the multiplexers 310 in the present embodiment include a first multiplexer 310-1 controlling application of data to the first data input $q_1$ of the dual-port RAM 300, a second multiplexer 310-2 controlling application of data to the second data input $q_2$ of the dual-port RAM 300, a third multiplexer 310-3 controlling application of data to a first input of the multiplier 302 of the arithmetic engine, a fourth multiplexer 310-4 controlling application of data to a second input of the multiplier 302 of the arithmetic engine, a fifth multiplexer 310-5 controlling application of data to the left output port $z_2$ of the given processor unit 110-$i$, a sixth multiplexer 310-6 controlling application of data to the right output port $z_3$ of the given processor unit 110-$i$, and a seventh multiplexer 310-7 controlling application of data to an input of the adder 304 of the arithmetic engine.

The multiplexers 310-1 through 310-7 are controlled by respective control signals $c_1, \ldots, c_7$ supplied by the control module 112, which in the present embodiment is assumed to be shared by the processor units 110. The control module 112 may comprise, for example, microcode or other suitable arrangements of hardware, software or firmware. Instructions executed by the processor units 110 specify defined states for the control signals $c_1, \ldots, c_7$ as well as for the read, write and address inputs $r_1$, $w_1$, $a_1$, $r_2$, $w_2$, $a_2$ of the dual-port RAM 300.

The inputs $q_1$ and $q_2$ of the dual-port RAM can be more formally expressed by the following set of equations:

$$q_1 \leftarrow \underset{c_1}{mux}(m_1, y_4, y_2)$$

$$q_2 \leftarrow \underset{c_2}{mux}(z_1, m_2, y_3, y_1)$$

where the control signals $c_1$ and $c_2$ can take three and four possible values to associate the $q_1$ and $q_2$ with the multiplexer inputs $m_1$, $y_4$, $y_2$, and $z_1$, $m_2$, $y_3$, $y_1$, respectively. Similarly, the outputs $z_1$, $z_2$, and $z_3$ are specified by the following set of equations:

$$z_1 \leftarrow \left(\underset{c_3}{mux}(m_1, y_4, y_2) \otimes \underset{c_4}{mux}(z_1, y_3)\right) \oplus \underset{c_7}{mux}(0, y_3, m_2, z_1)$$

$$z_2 \leftarrow \underset{c_5}{mux}(m_1, z_1)$$

$$z_3 \leftarrow \underset{c_6}{mux}(y_2, m_2, z_1)$$

where $\otimes$ and $\oplus$ denote a multiplication and addition over GF(q), respectively.

As an example, if the control module 112 sets the control signals $c_1$, $c_2$, and $c_3$ to respectively select the third, second and fourth multiplexer inputs, one obtains $z_1 \leftarrow (y_2 \otimes y_3) \oplus z_1$.

It is to be appreciated that other embodiments could use more or fewer multiplexers, as well as different types and arrangements of multiplexer circuitry or, more generally, switch fabrics. For example, based on the particular algorithm or set of algorithms to be executed in the device 102-1, the internal architecture of one or more of the processor units 110 can be customized by eliminating unnecessary multiplexer resources. Also, the particular configuration of the arithmetic engine that illustratively includes multiplier 302, adder 304 and register 306 may be varied in other embodiments.

The device 102-1 as described in conjunction with FIGS. 1 through 3 implements an area efficient and low power processor comprising processor units 110, control module 112, memory 114 and co-processor 115. The processor is particularly well suited for use in performing finite field arithmetic operations, such as Galois field arithmetic operations in a RS decoder or other type of FEC decoder. However, the processor is readily scalable and programmable to facilitate its implementation in a wide variety of different processing applications. As noted above, the processor comprising elements 110, 112, 114 and 115 may be configured in one or more illustrative embodiments to perform computations associated with a Berlekamp-Massey or modified Euclidean algorithm of a key equation solver within an algebraic FEC decoder.

The manner in which the processor units 110 of the type shown in FIG. 3 may be configured to perform computations associated with RS decoding will now be described in greater detail, with reference to FIGS. 4 through 8. As noted above, the processor units as arranged in the embodiments of FIGS. 4 and 7 may be viewed as illustrative of ring arrangements, while arrangement shown in FIG. 8 shows one set of processor units in a ring arrangement and another set of processor units in a parallel arrangement.

An RS(n,k) code over Galois field GF(q) is a non-binary cyclic code that consists of n symbols, where n≤q−1. Each codeword contains k information symbols and n−k parity or check symbols. This algebraic code has minimum distance n−k, and it is able to correct up to t=(n−k)/2 symbol errors. The redundancy is k/n, and the overhead is n/k−1. In practical applications, the field size is often of the form $q=2^m$, i.e., the elements of GF(q) are represented by m-bit symbols. Access network standards such as IEEE 10GEPON and FSAN XGPON typically specify the use of byte-oriented codes where m=8, and the maximum length of such codes is 255 symbols, i.e., 2040 bits. The RS(255,239) code is one example, and is able to correct 8 symbol errors with a 7% overhead. As another example, a RS(255,223) code is able to correct 16 symbol errors with 14% overhead. These and other RS codes are often interleaved to increase the burst error capability. An interleaving factor v gives a burst error correction capability of up to vmt bits. For example, an RS(255,239) code with interleaving depth 16 provides burst error correction of up to 1024 bits.

An RS(n,k) code over Galois field GF(q) may be characterized as having a generator polynomial $$G(x) = (x - \alpha^b)(x - \alpha^{b+1}) \ldots (x - \alpha^{b+2t-1}), \tag{1}$$

where $\alpha$ is a primitive element of GF(q) and b is an arbitrary offset. An information sequence of k m-bit symbols can be represented by the vector $(u_0, u_1, \ldots, u_{k-1})$, where $u_i \in GF(q)$, and equivalently by the polynomial $U(x) = u_{k-1} x^{k-1} + \ldots + u_1 x + u_0$. Systematic encoding of this sequence is achieved by selecting a codeword C(x) of length n that satisfies the following relation $$C(x) = U(x) \cdot x^{n-k} + (U(x) \cdot x^{n-k}) \bmod G(x). \tag{2}$$

The first k symbols of C(x) contain a copy of the information sequence, whereas the remaining n−k check symbols contain the remainder of the polynomial division of U(x) by G(x).

A given received word R(x) may be of the form R(x)=C(x)+E(x), where E(x) is the so-called error polynomial. An initial stage of an RS decoder comprises a syndrome generator module 224 that determines 2t syndromes $s_i$ given by $$s_i = R(\alpha^{i+b}) = \sum_{j=0}^{N-1} r_j \alpha^{(i+b)j} \tag{3}$$

for 0≤i≤2t−1.

Since R(x)=C(x)+E(x), and C(x) has, by definition, the values $\alpha^b$, $\alpha^{b+1}$, $\alpha^{b+2t-1}$ as roots, $s_i$ can be rewritten as $$s_i = E(\alpha^{i+b}) = \sum_{j=0}^{N-1} e_j \alpha^{(i+b)j} = \sum_{l=1}^{L} Y_l X_l^j. \quad (4)$$

where $X_l$ and $Y_l$ denote the error location and the error value, respectively. It follows that the 2L unknown values can be obtained from the 2t equations $s_0, \ldots, s_{2t-1}$, as long as L≤t. To compute these values, an auxiliary equation, known as the key equation, is commonly used. This equation is defined by $$S(x) \cdot \Lambda(x) = \Omega(x) \bmod x^{2t}, \quad (5)$$

where S(x), $\Lambda$(x) and $\Omega$(x) denote the syndrome polynomial of degree 2t−1, the error locator polynomial and the error evaluator polynomial, respectively. The key equation solver 204-1 or 204-2 in an RS decoder of FIG. 2 is illustratively configured to determine $\Lambda$(x) and $\Omega$(x) given S(x). The RS decoder will typically also comprise two additional modules, an error value computation module 226 and an error correction module 228. The error value computation module 226 typically contains a Chien search module and a Forney module to extract the values $X_l$ and $Y_l$. The Chien search determines the roots of the error locator polynomial $\Lambda$(x) to determine the error locations by evaluating the expression $\Lambda$($\beta$) for each non-zero $\beta$ in GF(q) and checking for zero. The Formey module determines the error values. The error correction module 228 uses the computed values $X_l$ and $Y_l$ to correct the buffered received word R(x).

As mentioned previously, the key equation solver 204-1 or 204-2 may implement a Berlekamp-Massey algorithm or a modified Euclidean algorithm. The key equation solver typically dominates the complexity of the RS decoder design in terms of computations and silicon area. Accordingly, in the embodiments to be described in conjunction with FIGS. 4, 7 and 8, it is the key equation solver that is implemented using the area efficient and low power processor configuration comprising multiple processor units 110 of the type illustrated in FIG. 3.

The Berlekamp-Massey algorithm is specified in more detail by the following pseudo-code. To simplify the notation, we define, for a given polynomial A(x) of degree p, the operator shl(A)=$a_{p-1}x^p + \ldots + a_0 x$.

```
function BM(S) begin
    Λ(x) ← 1, B(x) ← x, l ← 0, k ← − 1
    for i from 1 to 2t do begin
        δ ← ∑_{j=0}^{l} λ_j s_{i-j}
        if (δ ≠ 0) then begin
            Λ* ← Λ + δ · B, l* ← i − k
            if (l < l*) then begin
                B ← δ^{-1} Λ
                k ← i − l, l ← l*
            end
            B ← shl(B), Λ ← Λ*
        end
    end
    return Λ
end function
```

The modified Euclidean algorithm is specified in more detail by the following pseudocode. To simplify the notation, we use the operator swap(A, B) to represent the operation that assigns polynomial B to polynomial A and polynomial A to polynomial B.

```
function ME(S) begin
    U ← x^{2t}, V ← S, W ← 0, X ← 1, d ← 0
    for i from 1 to 2t do begin
        V ← shl(V), X ← shl(X), d ← d − 1
        if ((V_{2t} ≠ 0) and (d < 0)) then begin
            swap(U,V), swap(W,X), d ← −d
        end
        V ← u_{2t} · V − v_{2t} · U
        X ← u_{2t} · X − v_{2t} · W
    end
    Λ ← X, Ω ← V
    return Λ, Ω
end function
```

A common property of the Berlekamp-Massey and the modified Euclidean algorithm is that the number of arithmetic operations in their execution strongly depends on the number of errors in the received codeword. However, the number of Galois field multipliers in conventional key equation solver hardware is typically chosen to be equal to or greater than the maximum length of the error locator polynomial $\Lambda$(x), thereby matching or exceeding the maximum number of correctable errors for the given code.

The rationale for the use of more rather than less arithmetic circuitry is in the ease of implementation of control logic typical of such architectures as well as in the goal of achieving high processing throughput. Nevertheless, such a design choice results in a large number of poorly utilized Galois field multipliers. The poor utilization is a consequence of sizing of the hardware resources for the worst case, i.e., for processing of the maximum number of correctable errors. However, the occurrence of such cases is usually extremely infrequent due to the choice of FEC strength appropriate for the known bit error profile of the network. For example, for an input BER of $10^{-3}$, which is the highest BER allowed by the 10GEPON and XGPON standards, there are on average only two bit errors per codeword although the RS codes required by these standards are capable of correcting up to 16 byte errors. Consequently, the key equation solvers in optical network RS decoders can be highly inefficient in that they most frequently process received codewords with one or two errors, while performing the same number of algorithmic steps and using the same amount of hardware resources as for the case when the maximum number of correctable errors occurs.

In the embodiments to be described in conjunction with FIGS. 4 through 7, the key equation solver 204 utilizes a substantially smaller number of Galois field multipliers than the above-described conventional arrangements. For example, as illustrated in FIG. 3, the processor units 110 may each include only a single multiplier 302, with the operation of these processor units being coordinated in an efficient manner by control module 112. Such control logic may be implemented in hardware as a small microcode memory containing a limited number of instructions, such as 10-15 instructions, so its logical complexity does not create hardware overhead or longer signal delays compared to implementations based on logic gates. However, this memory-based implementation allows re-programming of the processor hardware to perform decoding of a variety of different types of RS codes or other FEC codes. Additionally, it enables sequential, multi-cycle execution of any Berlekamp-Massey and modified Euclidean algorithm steps that require a number of concurrent multiplications greater than the number of implemented processor units 110, in the infrequent cases when the number of errors in the processed codeword is large.

Figure 4:
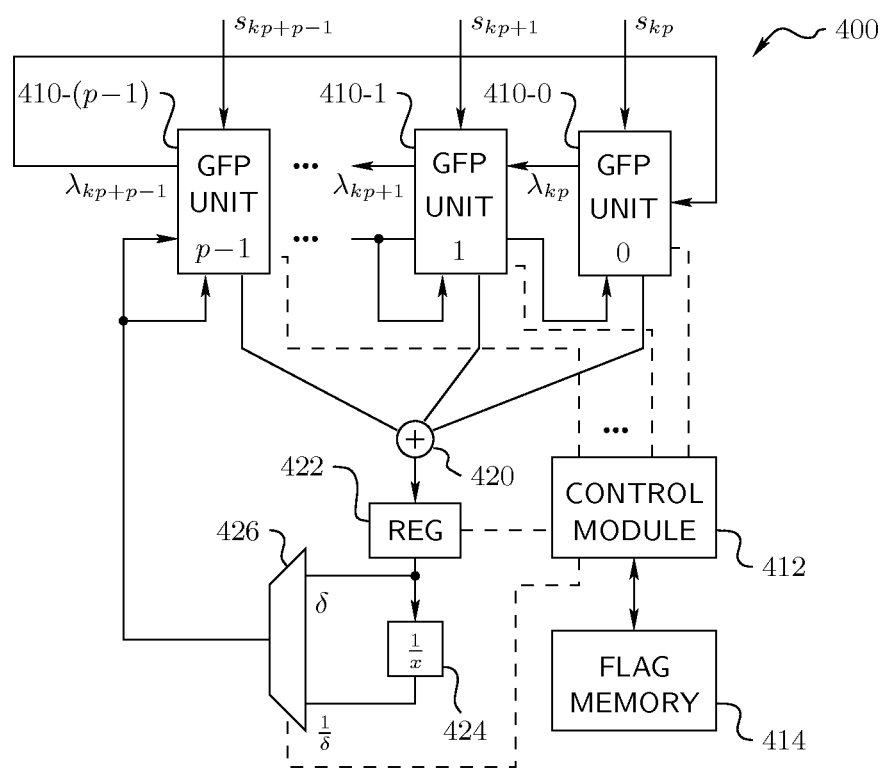
FIG. 4 shows a processor configured to implement a Berlekamp-Massey algorithm of a key equation solver in a FEC decoder of FIG. 2.

FIG. 4 shows a processor 400 configured to implement the Berlekamp-Massey algorithm in key equation solver 204-1 or 204-2 of FIG. 2A. In this embodiment, the processor has a single instruction, multiple data (SIMD) architecture comprising p processor units 410-0 through 410-($p$–1), control module 412 and flag memory 414, with each of the processor units 410 assumed to be configured in the manner illustrated in FIG. 3. The processor units 410 are also referred to as Galois field processor units or GFP units, and are denoted GFP unit 0 through GFP unit p–1. The elements ($s_i$, $s_{p+i}$, ...) of syndrome vector S are written to the dual-port RAM 300 of GFP unit i. Other inputs and outputs include $y_3$ and $z_2$ to enable the implementation of the left-shift operation of the error locator polynomial $\Lambda(x)$. Externally calculated values of $\delta$ and $\delta^{-1}$ are distributed to all GFP units through their respective $y_4$ inputs. The external co-processor 115 in this embodiment comprises a p-input adder 420, a register 422, an inverter module 424, and a multiplexer 426 used to select between the inverted and non-inverted version of $\delta$ in different program steps.

FIGS. 5 and 6 show an exemplary instruction format and instruction set, respectively, utilized in the processor 400 of FIG. 4.

The instruction format in FIG. 5 includes fields for read control, write control, multiplexer control, and next instruction/jump control. The read control and write control fields each specify values for $\lambda$, S and B, and the multiplexer control fields specify the control signals $c_1, \ldots, c_7$ for the multiplexers 310-1 through 310-7 within a given GFP unit 410.

FIG. 6 shows the mapping between the instructions of the instruction set and the corresponding line or lines of the pseudo-code. The instruction set is designed to minimize the number of clock cycles needed to execute the Berlekamp-Massey algorithm for each given syndrome and the associated number of symbol errors. This is achieved in two ways. First, the flag memory 414 stores information regarding first and last element positions for vectors $\Lambda$ and B, also referred to as "head" and "tail" positions. This information allows the processor to limit the number of multiplications involving $\Lambda$ and B to their actual length in every step of the algorithm. Second, the control module 412 minimizes the number of clock cycles in which no multiplication is performed to a single clock cycle for every pass through the main loop of the algorithm. As shown in FIG. 5, this clock cycle is associated with the execution of instruction DIFF_VALID.

Another factor affecting the multiplier utilization in the processor 400 is the number of GFP units 410. During the execution of the Berlekamp-Massey algorithm, vectors $\Lambda$ and B move through the processor RAM due to algorithmic changes in their degrees and due to the shift operation applied to vector $\Lambda$. The consequence of these moves is that their head and tail positions are often not aligned with the beginning and end of the array of GFP units. In a clock cycle in which the head of one of these vectors is stored in the memory of the last GFP unit, the same location in the memory of other GFP units will be empty. Therefore, when the content of this location from all GFP units is presented to the multiplier inputs, only one out of p multipliers will be performing a useful operation, which reduces the overall multiplier utilization. A similar observation applies to the tails of these two vectors.

The described effect of reduced utilization is more pronounced when the degrees of $\Lambda$ and B are small or when the number of GFP units in the processor is large because of the higher percentage of clock cycles with under-utilized arithmetic resources. Therefore, the number of GFP units should be kept as low as possible in order to keep the utilization high. However, in most practical cases, a single-GFP unit implementation is too slow to meet the throughput requirements of the communication channel. The practical lower limit for the number of GFP units should instead be determined as a function of the communication bit rate and the maximum clock speed for the particular key equation solver implementation technology.

While executing instruction DIFF_VALID, the control module 412 determines whether the output of the p-input adder 420 is equal to zero in order to decide which instruction should be executed next. To that end, the functionality of the control module 412 includes a zero detector. If a zero is detected at the output of the p-input adder 420, it will prompt the control module 412 to direct the GFP units 410-0 to 410-($p$–1) to execute instruction S_LAMBDA. Otherwise, the control module 412 directs the GFP units 410-0 to 410-($p$–1) to execute either instruction D_LAMBDA_UP1 or instruction LAMBDA_UP. In that case, the choice between the latter two instructions is made based on the input the flag memory 414 provides to the control module 412.

In this particular embodiment, the flag memory is adapted for processing of two vectors, such as the vectors $\Lambda$ and B associated with the execution of the Berlekamp-Massey algorithm. It is to be appreciated that a similar type of flag memory may be used as flag memory 714 in the processor 700 of FIG. 7, or in other processor embodiments described herein.

In one possible embodiment, the flag memory comprises a RAM storing the head and tail information for the processed vectors, as well as logic units tightly coupled to the said RAM and capable of updating the RAM contents at the request of the control module 412 or using the RAM content to generate flag information needed by the control module 412. Examples of the said logic units include shifters and comparators. The shift units perform an update of the information about a vector head and tail position, stored in the flag memory RAM to reflect the current position of the vector in the GFP RAM 300. Comparators perform the comparison of the head and tail positions of different vectors and their outputs represent the flags used by the control module 412. Further flags may include indicators of the presence of vector data in a particular row of the GFP RAM 300.

The number of RAM words in a given implementation of the flag memory 414 depends on the number of vectors being processed. In this embodiment, as noted above, it is assumed that there are two vectors, which may be the vectors $\Lambda$ and B associated with the execution of the Berlekamp-Massey algorithm. The bit width of each RAM word depends on the maximum number of different shift positions of the vectors in the dual-port RAM 300. Storage of vector head and tail information in the separate flag memory 414 is advantageous relative to storage of such information in the dual-port RAM 300 because the latter would consume at least two more bits for every vector element in the dual-port RAM 300 and also require additional clock cycles for processing this information. Each word of the RAM in the flag memory 414 is divided into two sections, a row section and a column section, specifying the respective row and column positions of the corresponding vector head or tail.

As noted above, the flag memory outputs provide information related to the head and tail position for the processed vectors. For example, this information indicates whether or not the first and last position of the processed vector are stored in the particular row of the multi-port RAM 300 that is identified by the row number specified by the control module 412 to the flag memory 414. The flag outputs provide instant information about the vector end positions, thereby allowing the corresponding parallel processor to achieve high multiplier utilization.

It is to be appreciated that the particular configuration of the flag memory may be varied in other embodiments to accommodate the needs of the particular processor application in which it is implemented. For example, additional or alternative output flags may be provided in other embodiments. In a further embodiment, the internal hardware architecture of the flag memory may be implemented in the form of a finite state machine in which the vector head and tail information would represent the state of the said state machine and are stored in registers rather than in RAM. Finally, in some embodiments, at least a portion of the functionality of the flag memory 414 may be incorporated in the control module 412.

Figure 7:
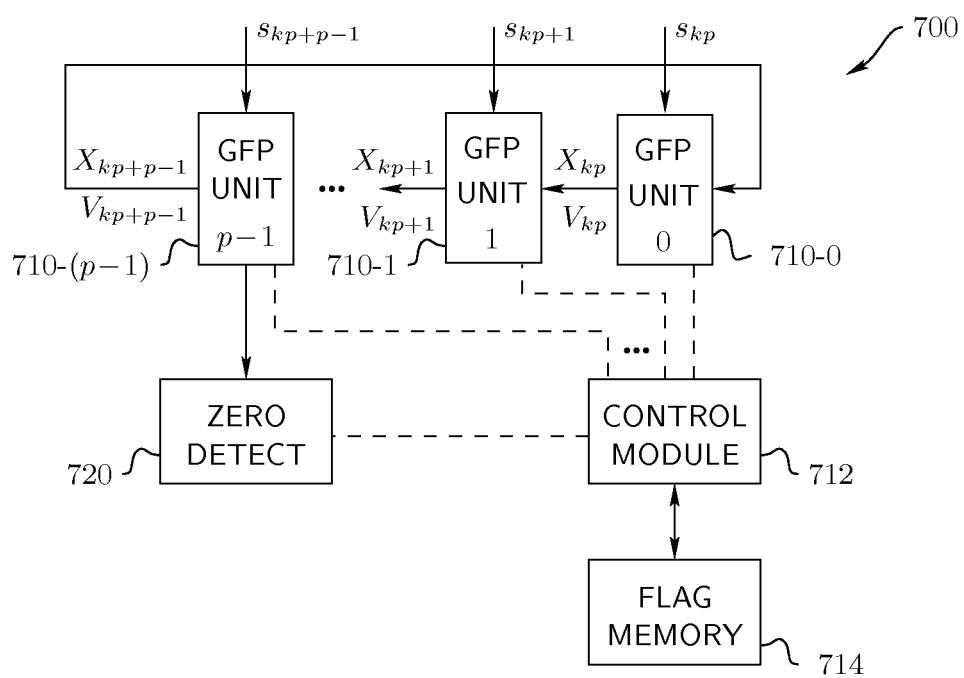
FIG. 7 shows a processor configured to implement a modified Euclidean algorithm of a key equation solver in the FEC decoder of FIG. 2.
Figure 8:
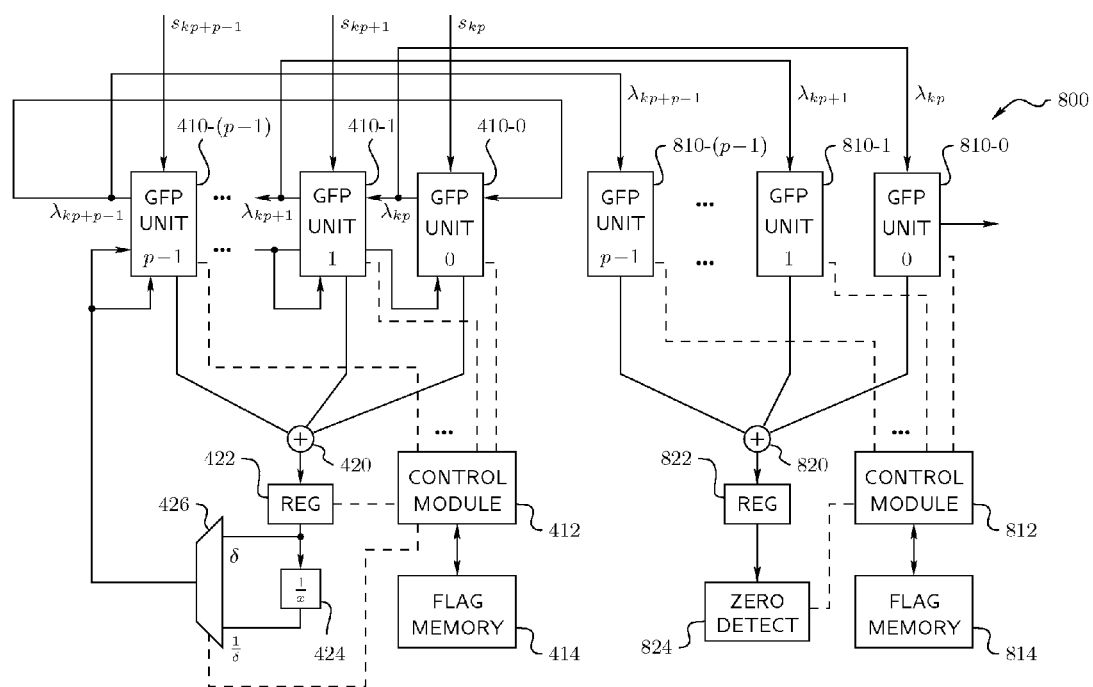
FIG. 8 shows an illustrative embodiment in which first and second sets of processor units implement a key equation solver and a Chien search module, respectively.

FIG. 7 shows a processor 700 configured to implement the modified Euclidean algorithm in key equation solver 204-1 or 204-2 of FIG. 2A. In this embodiment, the processor again has a SIMD architecture, this time comprising p processor units 710-0 through 710-($p-1$), control module 712 and flag memory 714, with each of the processor units 710 assumed to be configured in the manner illustrated in FIG. 3. The processor units 710 are once again also referred to as Galois field processor units or GFP units, and are more particularly denoted GFP unit 0 through GFP unit p−1. As indicated previously, the processor units 710 are configured in a ring arrangement.

The general architecture of processor 700 is therefore similar to that of processor 400 as previously described. The GFP units 710 store the syndrome vector in the same way as the corresponding units of the processor 400, and provide a left-shifting path for vectors V and X. The external co-processor 115 in the present embodiment implements a zero detector 720 which is used to detect the highest degree element of vectors V and U, in order for the control module 712 to skip a number of unnecessary multiplications with zeros.

FIG. 7 also provides an illustrative example of another advantageous feature of this embodiment of the invention, in which the zero detector is implemented as a co-processor, rather than being part of the control module 712. The operation of the control module 712 is substantially the same as that of control module 412 in processor 400, in that it determines the sequence of execution of processor instructions using inputs from the zero detector and the flag memory.

FIG. 8 shows one possible implementation of a cascaded arrangement of two sets of processor units with the sets of the processor units implementing a key equation solver and a Chien search module, respectively. The GFP units 410-0 to 410-($p-1$) are configured in a ring arrangement and perform the Berlekamp-Massey algorithm. Once the error locator polynomial Λ (x) has been determined, Chien search is used to determine the roots of Λ (x). The GFP units 810-0 to 810-($p-1$) are configured in a parallel arrangement and perform the GF-based multiplications, after which the results are added in module 820 and stored in register 822. The output of this register is then passed to zero-detect module 824. If the register output is zero, an error location is found. This is signaled to the control module 812, which then directs the GFP units 810 to either immediately output the root value or to store it in their internal memory.

In the case where the root value is output immediately upon its detection, it is sufficient to take the output from only one of the units GFP 810-0 to 810-($p-1$). In the case where all root values are output upon completion of the Chien search, the stored values of different roots may be output sequentially, from the internal memory of a single one of the GFP units 810-0 to 810-($p-1$), or simultaneously, from multiple or all of the GFP units.

In the embodiment depicted in FIG. 8, both the Berlekamp-Massey algorithm and the Chien search algorithm are implemented using p GFP units. However, it should be noted that in general one can use $p_1$ GFP units for the Berlekamp-Massey algorithm and $p_2$ GFP units for the Chien search algorithm (where $p_1$ and $p_2$ take different values) by properly transferring vector Λ from the first set of GFP units to the second set of GFP units. One can utilize an auxiliary memory to simplify this transfer.

In an alternative embodiment, the control modules 412 and 812 may be combined into a single control module, and the flag memories 414 and 814 may be combined as well.

Although FIG. 8 shows an implementation of the RS decoder in which the Berlekamp-Massey and Chien search algorithms are performed by two separate sets of processors, an alternative implementation is possible in which both algorithms are performed by the same group of processors. For example, the processor 400, capable of implementing the Berlekamp-Massey algorithm can also implement Chien search because it is equipped with all co-processing resources needed for implementation of Chien search.

As indicated previously, processors such as Berlekamp-Massey algorithm processor 400, the modified Euclidian algorithm processor 700, or the combined Berlekamp-Massey and Chien search processor 800 may be implemented using ASICs, FPGAs or other types of integrated circuits. For example, the processor 400 may be implemented in a 65 nm CMOS standard cell ASIC technology as well as in the Altera Stratix IV FPGA family. In both cases, the critical path is in the arithmetic engine and its maximum operating frequency is about 1 GHz for the ASIC and 350 MHz for the FPGA implementation. A single 4-GFP processor configuration with p=4 GFP units, in short 4-GFP, can support a total bandwidth of about 20 Gb/s in the ASIC implementation, or about 7 Gb/s in the FPGA implementation. Simulation results indicate that an average processing time for such a 4-GFP processor configuration is only 30% higher than that of a 32-GFP processor configuration, which means that in this particular implementation two 4-GFP processors will outperform a 32-GFP processor.

The illustrative embodiments described above provide area efficient and low power processor configurations that are particularly well suited for use in performing finite field arithmetic operations, such as Galois field arithmetic operations in a RS decoder or other type of FEC decoder. For example, when used to implement a key equation solver based on a Berlekamp-Massey or modified Euclidean algorithm in an RS decoder, the resulting processor exhibits a small circuit footprint and consequently a narrow transistor leakage path, which makes it energy-efficient in deep submicron CMOS processes where leakage dissipation represents a significant part of the total energy consumption.

Also, for a fixed number of Galois field multipliers, the grouping of the multipliers into several smaller parallel processors provides a significantly higher processing throughput than architectures in which all multipliers are part of a single large processor or a custom hardware module. A very small amount of hardware may therefore be sufficient to meet throughput RS decoding requirements in multi-gigabit optical communication links. This can significantly reduce the cost and complexity of optical networking devices, as well as reduce operating costs associated with those devices by decreasing the energy consumption associated with RS decoding.

Furthermore, the processors in the illustrative embodiments are readily scalable and programmable to facilitate their implementation in a wide variety of different processing applications. The particular functionality implemented by a given processor can therefore be assigned dynamically. For example, the processor can be programmed to perform functions of a key equation solver using the Berlekamp-Massey or modified Euclidean algorithms, and can be reprogrammed to find roots of the locator polynomial using Chien search. If programs executing these different functions are stored in the processor program memory, each implemented processor can be assigned a new functionality dynamically. Also, the scalability and programmability of the processors allows dynamic changes in the error correction code and its correction strength.

It should be noted that the processors disclosed herein are not limited to use in FEC decoding, and can be more generally utilized in a wide variety of other applications. For example, embodiments of the invention can be used to perform computations associated with at least one of encryption and decryption, such as Galois field arithmetic used in conjunction with the Advanced Encryption Standard (AES). Also, in a given embodiment different ones of the processor units may be executing different algorithms, assisted by one or more programmable co-processors.

As indicated previously, embodiments of the present invention may be implemented at least in part in the form of one or more software programs that are stored in a memory or other computer-readable medium of a processing device of a communication system. System components such as the key equation solvers 204 may be implemented at least in part using software programs. Of course, numerous alternative arrangements of hardware, software or firmware in any combination may be utilized in implementing these and other system elements in accordance with the invention. For example, embodiments of the present invention may be implemented in one or more ASICs, FPGAs or other types of integrated circuit devices, in any combination. Such integrated circuit devices, as well as portions or combinations thereof, are examples of "circuitry" as the latter term is used herein.

It should again be emphasized that the embodiments described above are presented for purposes of illustration only, and should not be interpreted as limiting in any way. Other embodiments may use different types and arrangements of communication system components, processing device configurations and processor unit elements, depending on the needs of the particular processing application. Alternative embodiments may therefore utilize the techniques described herein in other contexts in which it is desirable to implement efficient signal processing. Also, it should be noted that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
    a plurality of processor units arranged to operate concurrently and in cooperation with one another; and
    control logic configured to direct the operation of the plurality of processor units to perform computations associated with decoding of a designated forward error correction code;
    wherein at least a given one of the processor units comprises:
        a memory;
        an arithmetic engine; and
        a switch fabric providing controllable connectivity between the memory, the arithmetic engine and input and output ports of the given processor unit;
    the switch fabric having control inputs driven by the control logic;
    wherein the control logic is configured to drive the control inputs of the switch fabric to direct the arithmetic engine of the given processor unit to perform first and second different portions of the decoding of said designated forward error correction code; and
    wherein the first portion of the decoding of said designated forward error correction code comprises computations of a key equation solver and the second portion of the decoding of said designated forward error correction code comprises computations of an error value computation module.

2. The apparatus of claim 1 wherein the memory comprises a multi-port memory configured to permit the arithmetic engine to read at least two different input variables simultaneously.

3. The apparatus of claim 1 wherein the processor units are arranged such that the input and output ports of the given processor unit comprise first and second input ports and first and second output ports, and are configured to permit shifting of data between the given processor unit and other ones of the processor units.

4. The apparatus of claim 1 wherein the arithmetic engine comprises:
    a multiplier;
    an adder having a first input coupled to an output of the multiplier; and
    a register having an input coupled to an output of the adder.

5. The apparatus of claim 2 wherein the switch fabric comprises:
    a multiplexer controlling application of data to a first data input of the multi-port memory; and
    a multiplexer controlling application of data to a second data input of the multi-port memory.

6. The apparatus of claim 1 wherein the switch fabric comprises:
    a multiplexer controlling application of data to a first input of a multiplier of the arithmetic engine; and
    a multiplexer controlling application of data to a second input of the multiplier of the arithmetic engine.

7. The apparatus of claim 1 wherein the switch fabric comprises:
    a multiplexer controlling application of data to a first output port of the given processor unit; and
    a multiplexer controlling application of data to a second output port of the given processor unit.

8. The apparatus of claim 1 wherein the switch fabric comprises:
    a multiplexer controlling application of data to an input of an adder of the arithmetic engine.

9. The apparatus of claim 1 wherein the given processor unit further comprises an input port configured to receive an input from an external co-processor.

10. The apparatus of claim 1 wherein the processor units comprise respective finite field processor units each configured to perform computations over a finite field.

11. The apparatus of claim 10 wherein the finite field comprises a Galois field GF(q) of the form $q=2^m$ where the elements of GF(q) are represented by m-bit symbols.

12. An apparatus comprising:
a plurality of processor units arranged to operate concurrently and in cooperation with one another; and
control logic configured to direct the operation of the plurality of processor units to perform computations associated with decoding of a designated forward error correction code;
wherein at least a given one of the processor units comprises:
a memory;
an arithmetic engine; and
a switch fabric providing controllable connectivity between the memory, the arithmetic engine and input and output ports of the given processor unit;
the switch fabric having control inputs driven by the control logic;
wherein the control logic is configured to drive the control inputs of the switch fabric to direct the arithmetic engine of the given processor unit to perform first and second different portions of the decoding of said designated forward error correction code; and
wherein a total number of multipliers collectively provided by the processor units is less than a maximum number of errors that are correctable per codeword using said designated forward error correction code.

13. An apparatus comprising:
a plurality of processor units arranged to operate concurrently and in cooperation with one another; and
control logic configured to direct the operation of the plurality of processor units to perform computations associated with decoding of a designated forward error correction code;
wherein at least a given one of the processor units comprises:
a memory;
an arithmetic engine; and
a switch fabric providing controllable connectivity between the memory, the arithmetic engine and input and output ports of the given processor unit;
the switch fabric having control inputs driven by the control logic;
wherein the control logic is configured to drive the control inputs of the switch fabric to direct the arithmetic engine of the given processor unit to perform first and second different portions of the decoding of said designated forward error correction code; and
wherein the first portion of the decoding of said designated forward error correction code comprises computations of at least one of a Berlekamp-Massey algorithm and a modified Euclidean algorithm and the second portion of the decoding of said designated forward error correction code comprises computations of a Chien search.

14. The apparatus of claim 1 wherein the processor units are configured to perform computations associated with at least one of encryption and decryption.

15. A decoder having a key equation solver comprising the apparatus of claim 1.

16. An integrated circuit comprising the apparatus of claim 1.

17. A method comprising:
configuring a plurality of processor units such that said processor units are arranged to operate concurrently and in cooperation with one another, with each of the processor units comprising a memory and an arithmetic engine; and
controlling the processor units to perform computations associated with decoding of a designated forward error correction code;
wherein controlling the processor units comprises driving control inputs of a switch fabric to direct the arithmetic engine of a given one of the processor units to perform first and second different portions of the decoding of said designated forward error correction code; and
wherein the first portion of the decoding of said designated forward error correction code comprises computations of a key equation solver and the second portion of the decoding of said designated forward error correction code comprises computations of an error value computation module.

18. A method comprising:
configuring a plurality of processor units such that said processor units are arranged to operate concurrently and in cooperation with one another, with each of the processor units comprising a memory and an arithmetic engine; and
controlling the processor units to perform computations associated with decoding of a designated forward error correction code;
wherein controlling the processor units comprises driving control inputs of a switch fabric to direct the arithmetic engine of a given one of the processor units to perform first and second different portions of the decoding of said designated forward error correction code; and
wherein a total number of multipliers collectively provided by the processor units is less than a maximum number of errors that are correctable per codeword using said designated forward error correction code.

19. A method comprising:
configuring a plurality of processor units such that said processor units are arranged to operate concurrently and in cooperation with one another, with each of the processor units comprising a memory and an arithmetic engine; and
controlling the processor units to perform computations associated with decoding of a designated forward error correction code;
wherein controlling the processor units comprises driving control inputs of a switch fabric to direct the arithmetic engine of a given one of the processor units to perform first and second different portions of the decoding of said designated forward error correction code; and
wherein the first portion of the decoding of said designated forward error correction code comprises computations of at least one of a Berlekamp-Massey algorithm and a modified Euclidean algorithm and the second portion of the decoding of said designated forward error correction code comprises computations of a Chien search.

20. A non-transitory computer-readable storage medium having embodied therein executable program code that when executed by a processing device causes the processing device to:
configure a plurality of processor units such that said processor units are arranged to operate concurrently and in cooperation with one another, with each of the processor units comprising a memory and an arithmetic engine; and control the processor units to perform computations associated with decoding of a designated forward error correction code;

wherein controlling the processor units comprises driving control inputs of a switch fabric to direct the arithmetic engine of a given one of the processor units to perform first and second different portions of the decoding of said designated forward error correction code; and wherein the first portion of the decoding of said designated forward error correction code comprises computations of a key equation solver and the second portion of the decoding of said designated forward error correction code comprises computations of an error value computation module.

21. The apparatus of claim 1 wherein the arithmetic engine provides a single finite field multiplier and a single adder.

22. The apparatus of claim 1 wherein:

the memory of the given processor unit comprises a multi-port memory configured to permit the arithmetic engine to read at least two different input variables simultaneously, the multi-port memory comprising: a first set of address, read and write inputs; at least a second set of address, read and write inputs; a first data input; at least a second data input; a first data output; and at least a second data output;

the arithmetic engine of the given processor unit provides a single finite field multiplier and a single adder;

the switch fabric comprises at least two multiplexers providing controllable connectivity between the first and second data outputs of the multi-port memory, one or more data input ports of the given processor unit, and inputs of the single finite field multiplier and single adder of the arithmetic engine of the given processor unit; and the control logic is configured to drive control inputs of the two or more multiplexers of the switch fabric to direct the single finite field multiplier and the single adder of the arithmetic engine of the given processor unit:

to perform computations of at least one of a Berlekamp-Massey algorithm and a modified Euclidean algorithm; and to perform computations of a Chien search.

23. The non-transitory computer-readable storage medium of claim 20 wherein a total number of multipliers collectively provided by the processor units is less than a maximum number of errors that are correctable per codeword using said designated forward error correction code.

24. The non-transitory computer-readable storage medium of claim 20 wherein the first portion of the decoding of said designated forward error correction code comprises computations of at least one of a Berlekamp-Massey algorithm and a modified Euclidean algorithm and the second portion of the decoding of said designated forward error correction code comprises computations of a Chien search.

* * * * *